(12) United States Patent
Sun et al.

(10) Patent No.: US 11,919,115 B2
(45) Date of Patent: Mar. 5, 2024

(54) FLEXIBLE DOT MATRIX BONDING APPARATUS AND ADAPTIVE CLAMPING METHOD FOR DISK-TYPE PLANAR COMPONENT

(71) Applicant: DALIAN UNIVERSITY OF TECHNOLOGY, Dalian (CN)

(72) Inventors: Yuwen Sun, Dalian (CN); Shuyang Yan, Dalian (CN); Shutao Qi, Dalian (CN); Jinting Xu, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 16 days.

(21) Appl. No.: 17/921,480

(22) PCT Filed: Oct. 13, 2021

(86) PCT No.: PCT/CN2021/123406
§ 371 (c)(1),
(2) Date: Oct. 26, 2022

(87) PCT Pub. No.: WO2023/060457
PCT Pub. Date: Apr. 20, 2023

(65) Prior Publication Data
US 2023/0286091 A1    Sep. 14, 2023

(51) Int. Cl.
*B23Q 3/06* (2006.01)
*B23B 25/06* (2006.01)
*B23Q 3/08* (2006.01)

(52) U.S. Cl.
CPC .............. *B23Q 3/065* (2013.01); *B23B 25/06* (2013.01); *B23Q 3/084* (2013.01)

(58) Field of Classification Search
CPC .......... B23Q 3/065; B23Q 3/084; B23Q 3/08; B23B 25/06
See application file for complete search history.

(56) References Cited

U.S. PATENT DOCUMENTS 3,271,911 A * 9/1966 McKenna ................ B24D 5/02
51/307
4,461,127 A * 7/1984 Hanger .................. B24D 9/003
451/514

(Continued)

FOREIGN PATENT DOCUMENTS

CN    201346752 Y    11/2009
CN    103847032 A    6/2014
(Continued)

*Primary Examiner* — Lawrence Averick
(74) *Attorney, Agent, or Firm* — Muncy, Geissler, Olds & Lowe, P.C.

(57) ABSTRACT

The present invention discloses a flexible dot matrix bonding apparatus and an adaptive clamping method for a disk-type planar component. The apparatus mainly comprises three components: a substrate, connecting rods and an auxiliary support. The threaded holes in a circumferential array are uniformly distributed in the substrate, and the connecting rods are fixed at different circumferential positions of the substrate in a threaded connection manner, which play a role in bonding and supporting the disk-type planar component. The auxiliary support is matched with the substrate, so that a workpiece after turning can be taken out without damage. According to detection results of machining deformation of the disk-type planar component, the installation positions of the connecting rods on the substrate are adjusted accordingly, thus changing bonding positions of the disk-type planar component. Finally, an adaptive clamping method aiming at reducing the machining deformation of the disk-type planar component is formed.

9 Claims, 4 Drawing Sheets

(56) References Cited

U.S. PATENT DOCUMENTS

| | | | | |
|---|---|---|---|---|
| 4,847,732 A | * | 7/1989 | Stopper | H01L 23/5382 |
| | | | | 257/E23.008 |
| 10,974,357 B2 | * | 4/2021 | Murota | B23Q 11/0858 |
| 2015/0224625 A1 | * | 8/2015 | Lehuu | B24D 3/18 |
| | | | | 451/442 |
| 2020/0130122 A1 | * | 4/2020 | Murota | B23Q 5/10 |

FOREIGN PATENT DOCUMENTS

| | | |
|---|---|---|
| CN | 104551733 A | 4/2015 |
| CN | 108015569 A | 5/2018 |
| CN | 108214006 A | 6/2018 |
| CN | 110035616 A | 7/2019 |
| CN | 111300095 A | 6/2020 |
| CN | 111360569 A | 7/2020 |
| CN | 111482337 B | 5/2021 |
| CN | 112828633 A | 5/2021 |
| CN | 113351891 A | 9/2021 |
| JP | 2014111298 A | 6/2014 |

\* cited by examiner

FLEXIBLE DOT MATRIX BONDING APPARATUS AND ADAPTIVE CLAMPING METHOD FOR DISK-TYPE PLANAR COMPONENT

TECHNICAL FIELD

The present invention belongs to the technical field of turning clamping for a disk-type planar component, and particularly relates to a flexible dot matrix bonding apparatus and an adaptive clamping method.

BACKGROUND

Some thin-walled disk-type planar components which are applied to electronic information, energy power and other fields have extremely high surface shape accuracy requirements, but the components are easily deformed under the stress due to large diameter-thickness ratio and poor rigidity, therefore, the difficulty of ensuring the turning accuracy is extremely high. The clamping form not only directly affects the clamping deformation of components, but also changes the stress release mode in the process of machining the components, thus affecting the surface shape accuracy of the thin-walled disk-type planar component after machining.

At present, a commonly used a vacuum adsorption clamping method is that the planar components are firmly clamped on a fixture surface through the pressure difference between a vacuum cavity in the fixture and the atmosphere, which has the advantages of simple operation and reliable clamping. However, the large clamping deformation generated by the adsorption force and the strong constraint effect on the stress release in the machining process are main problems that restrict the machining accuracy of the thin-wall planar component under the vacuum adsorption clamping condition. Different from the vacuum adsorption clamping method, a bonding method adopts the low-stress adhesive to fix the workpiece on the fixture, which not only weakens the constraint effect of the clamping boundary, but also effectively reduces the clamping deformation of the thin-walled disk-type planar component. The bonding method is applied in the polishing process of optical components, and the positioning surfaces are generally bonded integrally. The patent CN103847032A adopts a bonding method with light glue plate liquid wax to bond the whole positioning surface of the disk-type component, which forms grinding and polishing processes that meets the batch machining for ultrathin quartz wafers on this basis. Due to the volume shrinkage of the adhesive and the randomness of the curing sequence thereof, the bonding deformation and the deformation complexity of the thin-walled planar component are further increased in the process of bonding the whole surface. Patent CN111482337B designs a local bonding fixture used for the grinding and polishing processes for the ultrathin disk-type part. The asphalt powder is stuck on an array boss structure of the fixture. The disk-type component can be fixed on the fixture due to the adhesive force generated in the process of cooling the melted asphalt powder. The clamping method reduces the bonding deformation of the ultrathin disk-type part, but fails to effectively control the stress deformation of the disk-type component.

According to the existing bonding technical solution, although the bonding area of the disk-type component can be reduced by reducing the number of lug bosses in the local bonding fixture to weaken the constraint effect of the bonding boundary on the stress release in the machining process, an unsupported area of the workpiece is increased, and the elastic cutter relieving deformation of the thin-walled component under the cutting forces is also intensified. In addition, most of the existing local bonding apparatuses are special fixtures for a certain process of a certain part, but for different disk-type components and even different machining stages of the same disk-type component, the stress states in the component are not same, and the corresponding optimum bonding scheme is inevitably somewhat different. At this moment, a special fixture adopting the fixed structure is difficult to meet the optimal clamping requirement for the disk-type planar component in the turning process.

SUMMARY

In view of the defects in the prior art, the present invention provides a flexible dot matrix bonding apparatus and an adaptive clamping method for a turning process of a disk-type planar component, to solve a problem that the existing bonding apparatus and the method are difficult to meet the optimal clamping requirement for the disk-type planar component in the turning process.

The technical solution of the present invention is as follows:

A flexible dot matrix bonding apparatus with an adjustable bonding position for a disk-type planar component comprises three components: a substrate, connecting rods and an auxiliary support.

The trimming threaded holes are circumferentially and uniformly distributed in the substrate of the bonding apparatus, mounting holes are circumferentially and uniformly distributed at an edge of an upper surface, and a groove is located at the middle. Multiple threaded through holes and arc grooves are formed in the groove, and a sealing structure is arranged at an outer edge of the groove.

For the connecting rod of the bonding apparatus, a hexagonal socket counterbore is formed on a bottom surface, and an external thread is formed at the bottom.

The auxiliary support of the bonding apparatus contains multiple lug bosses, wherein arc silicone rubber plates are pasted on upper surfaces of the lug bosses, and a cross-sectional profile of the lug boss is identical to that of the arc silicone rubber plate.

The flexible dot matrix bonding apparatus is assembled according to the structural characteristics of above components, to be adapted for various actual working conditions of the disk-type planar component, specifically:

When the disk-type planar component is machined, the connecting rods are firstly fixed to the substrate by adopting a threaded connection manner. According to the selected bonding clamping scheme, the connecting rods on the substrate are divided into two types, which respectively play roles in connecting and supporting the disk-type planar component. The adhesive (hot melt adhesive or wax) is coated on upper surfaces of the connecting rods which play the role in connecting, and circular silicone rubber plates are pasted on upper surfaces of the connecting rods which play the role of auxiliary support, to form a dot matrix clamping apparatus. The disk-type planar component to be machined is placed on a combined dot matrix clamping apparatus, and after the adhesive is cured, the height of the connecting rod which plays the role in auxiliary support is adjusted by adopting a hexagonal socket wrench until the circular silicone rubber plate thereon contacts a clamping surface of the disk-type planar component.

When the disk-type planar component is disassembled, the bonding apparatus and the disk-type planar component that are bonded to each other are firstly placed on a heating platform, and the hot melt adhesive between the connecting rod and the disk-type planar component is melted. At this moment, the disk-type planar component can rotate freely in the sealing structure of the bonding apparatus, but it is difficult to take the disk-type planar component out. Therefore, the combined structure is placed on the auxiliary support, and the lug boss on the auxiliary support penetrates through the arc groove on the substrate. The arc silicone rubber plate thereon contacts the clamping surface of the disk-type planar component, and then the machined disk-type planar component is jacked up, thus realizing that the workpiece is taken out without damage.

By giving full play to the flexible and adjustable structure of the designed bonding apparatus, an adaptive clamping method for reducing the machining deformation of the disk-type planar component is proposed by adopting the above apparatus. The specific steps are as follows:

step one, according to the balance conditions of the force and the moment in the cutting process of the disk-type planar component, primarily selecting the number and the positions of bonding points of the disk-type planar component; installing connecting rods on the substrate, and adjusting the axial height of the connecting rods to the appropriate position; and according to a primary bonding scheme, pasting the circular silicone rubber plates on the upper surfaces of parts of the connecting rods;

step two, placing the whole bonding apparatus on the heating platform for preheating; when preheating is finished, uniformly coating a layer of hot melt adhesive on the upper surface of the connecting rod on which the silicone rubber plat is not pasted, and placing the disk-type planar component on the combined dot matrix bonding apparatus; subsequently, closing the heating platform, and cooling and solidifying the adhesive between the disk-type planar component and the connecting rod, thus fixing the workpiece to the bonding apparatus; fixing the bonding apparatus on an ultra-precision machine tool by adopting bolts that are matched with mounting holes of the substrate; installing the trimming bolts on the trimming threaded holes of the substrate, and adjusting the trimming bolts until the detection results of dynamic balance of the machine tool meet the requirements;

step three, after the machining is finished, jacking up the disk-type planar component by using the auxiliary support; and measuring a machining surface shape of the disk-type planar component by adopting a non-contact measuring apparatus, thus obtaining the deformation distribution thereof;

step four, adjusting a clamping scheme for the disk-type planar component according to the deformation detection results; and reducing the number of bonding points in a large deformation area, and weakening the boundary constraint effect in the area, so that the unbalanced stress induced by the material removal is fully released in the machining process, thus reducing the machining deformation of the disk-type planar component when the constraint is unloaded;

step five, refixing the disk-type planar component on the bonding apparatus according to the revised clamping scheme; then installing the bonding apparatus on the ultra-precision machine tool; readjusting the dynamic balance of the machine tool; and finishing the subsequent machining for the disk-type planar component according to the given turning parameters; and step six, detecting the machining surface shape of the disk-type planar component; evaluating the effect of a new clamping scheme, and determining current deformation distribution of the disk-type planar component, to provide data support for the adjustment of the subsequent clamping scheme; and repeating the processes of the step four, step five and step six until the geometric dimension and the surface shape precision of the disk-type planar component are converged to the expected target.

Compared with the prior art, the present invention has the beneficial effects that:

(1) The present invention designs a flexible dot matrix bonding apparatus for a turning process of the disk-type planar component. The users can more freely adjust the bonding position of the disk-type planar component according to the actual condition, to meet the optimal clamping requirements for the disk-type planar component in different stress states.

(2) The present invention designs a clamping scheme of "bonding and auxiliary support" for the disk-type planar component, which reduces the number of connecting rods that play the role in bonding. Therefore, the constraint effect of the clamping boundary on the stress release in the process of machining the disk-type planar component is reduced, and the problem of serious elastic cutter relieving deformation due to the fact that the number of the bonding points are less and the disk-type planar component without a support area is larger is solved. The clamping scheme effectively enhances the machining surface shape accuracy of the disk-type planar component.

(3) The present invention designs an auxiliary support structure that is matched with the substrate. The disk-type planar component can be conveniently jacked up from the sealing structure by utilizing the structure, thereby realizing that the workpiece after turning is taken out without damage.

In the figures: 1. substrate; 11. trimming threaded hole; 12. arc groove; 13. mounting hole; 14. sealing structure; 15. threaded through hole; 2. connecting rod; 21. hexagonal socket counterbore; 22. outer thread; 3. auxiliary support; 31. lug boss; 32. arc silicone rubber plate; 4. trimming bolt; 5. circular silicone rubber plate; and 6. disk-type plane component.

DETAILED DESCRIPTION

In order to make the purpose, features, and advantages of the present invention more obvious and understandable, the present invention is further described below with reference to the drawings and in conjunction with specific embodiments, so that those skilled in the art can implement the present invention with reference to the words of the description. The protection scope of the present invention is not limited to the detailed description. Apparently, the embodiments described below are merely part of the embodiments of the present invention, not all of the embodiments. Based on the embodiments in the present invention, all other embodiments obtained by those ordinary skilled in the art without contributing creative labor will belong to the protection scope of the present invention.

A flexible dot matrix bonding apparatus for disk-type planar components mainly comprises three components: a substrate 1, connecting rods 2 and an auxiliary support 3.

Figure 1:
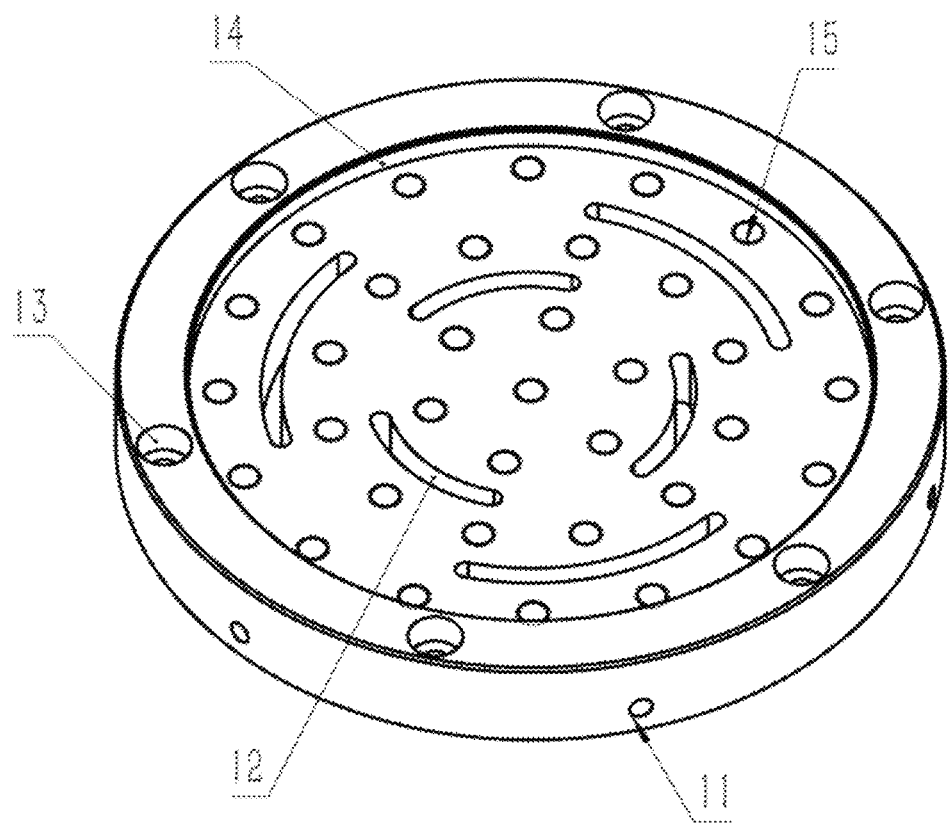
FIG. 1 is a structural schematic diagram of a substrate of a flexible dot matrix bonding apparatus.

As shown in FIG. 1, the trimming threaded holes 11 are circumferentially and uniformly distributed in the substrate 1, mounting holes 13 are circumferentially and uniformly distributed at an edge of an upper surface, and a groove is located at the middle. Multiple arc grooves 12 and threaded through holes 15 are formed in the groove, and a sealing structure 14 is arranged at an outer edge of the groove.

Figure 2:
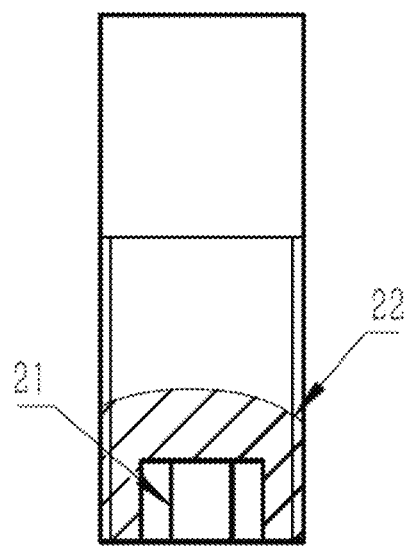
FIG. 2 is a structural schematic diagram of a connecting rod of a flexible dot matrix bonding apparatus.

As shown in FIG. 2, for the connecting rod 2 of the bonding apparatus, a hexagonal socket counterbore 21 is formed on a bottom surface, and an external thread 22 is formed at the bottom.

Figure 3:
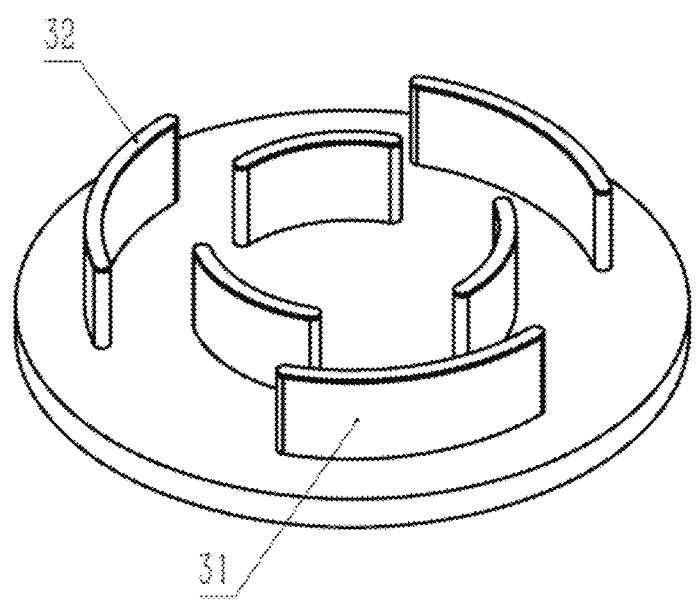
FIG. 3 is a structural schematic diagram of an auxiliary support of a flexible dot matrix bonding apparatus.

As shown in FIG. 3, the auxiliary support 3 of the bonding apparatus contains multiple lug bosses 31, wherein arc silicone rubber plates 32 are pasted on upper surfaces of the lug bosses 31, and a cross-sectional profile of the lug boss is identical to that of the arc silicone rubber plate.

Figure 4:
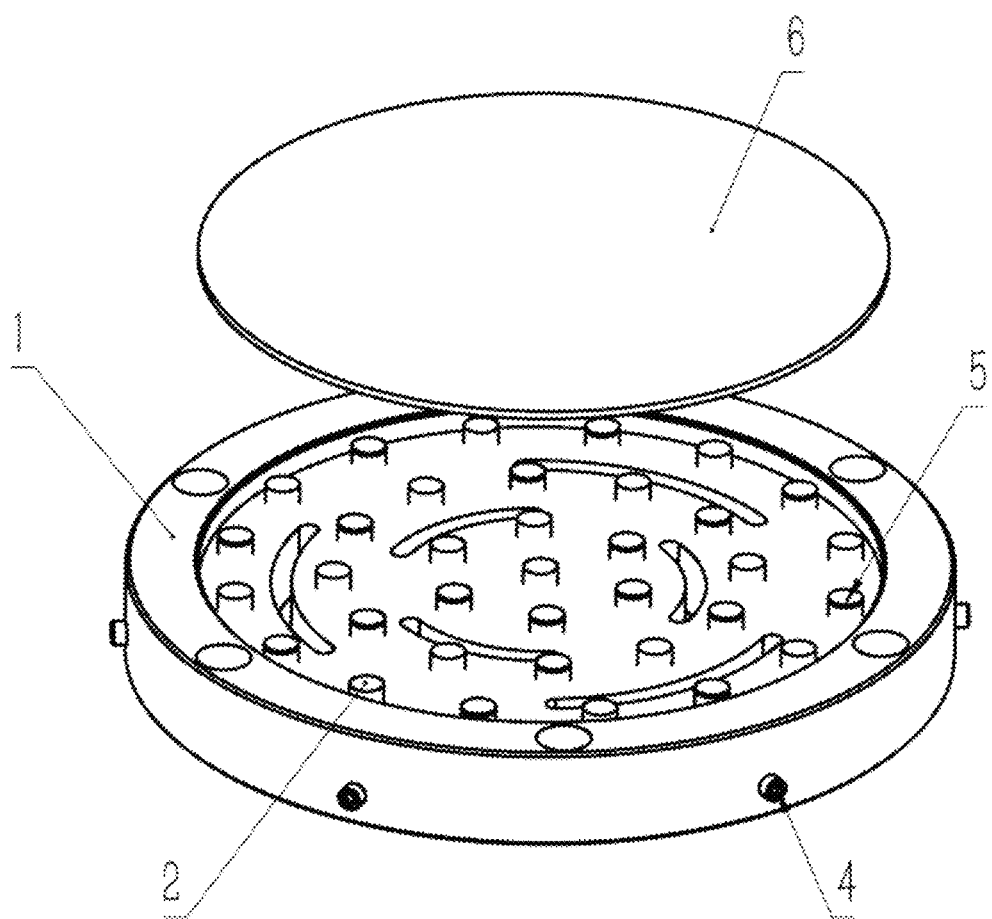
FIG. 4 is a hierarchical view of a disk-type planar component in a clamping state.

The flexible dot matrix bonding apparatus is assembled according to the structural characteristics of above components, to be adapted for various actual working conditions of the disk-type planar component, specifically:

As shown in FIG. 4, when the disk-type planar component 6 is machined, the connecting rods 2 are fixed to the substrate 1 firstly by using the mating relationship between the external thread 22 at the bottom of the connecting rod 2 and an internal thread at the threaded through hole 15 on the substrate 1. According to the selected bonding clamping scheme, the connecting rods 2 on the substrate 1 are divided into two types, which respectively play roles in connecting and supporting the disk-type planar component 6. The adhesive (hot melt adhesive or wax) is coated on upper surfaces of the connecting rods 2 which play the role in connecting, and circular silicone rubber plates 5 are pasted on upper surfaces of the connecting rods 2 which play the role in auxiliary support. The disk-type planar component 6 to be machined is placed on a combined dot matrix clamping apparatus, and after the adhesive is cured, the height of the connecting rods 2 which play the role in auxiliary support is adjusted through a hexagonal socket wrench which is matched with the hexagonal socket counterbore 21 until the circular silicone rubber plate 5 thereon contacts a clamping surface of the disk-type planar component 6.

Figure 5:
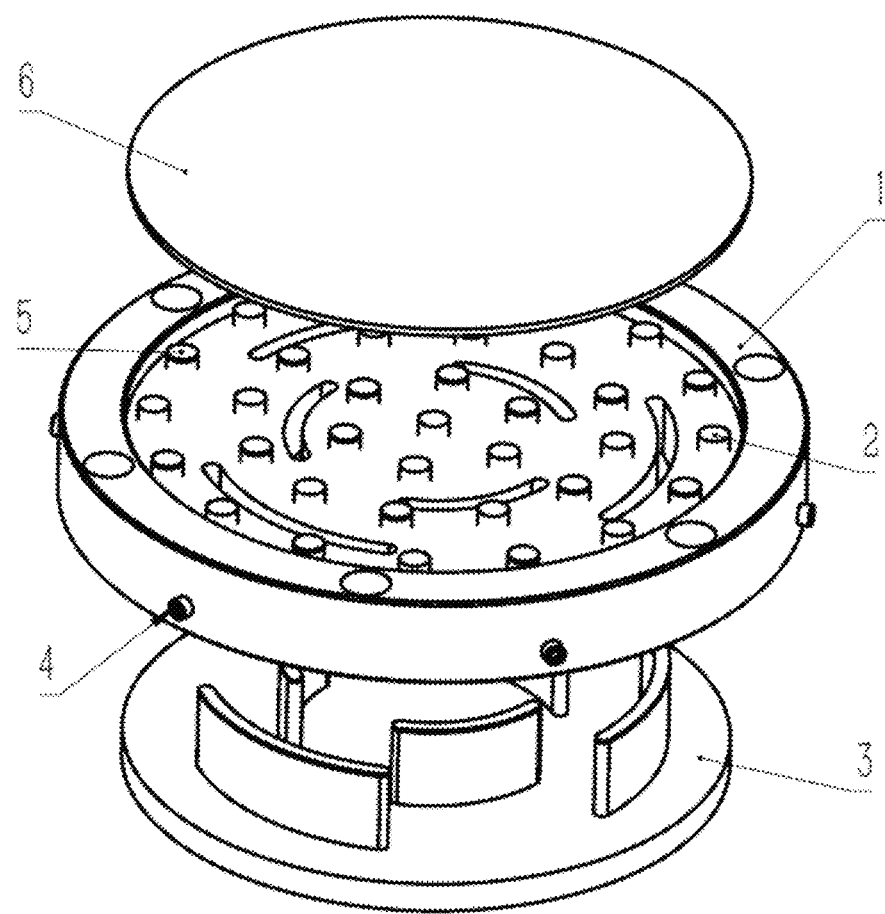
FIG. 5 is a hierarchical view of an apparatus when a disk-type planar component is disassembled.

As shown in FIG. 5, when the disk-type planar component 6 is disassembled, the bonding apparatus and the disk-type planar component 6 that are bonded to each other are firstly placed on a heating platform, and the hot melt adhesive between the connecting rod 2 and the disk-type planar component 6 is melted. At this moment, the disk-type planar component 6 can rotate freely in the sealing structure 14 of the bonding apparatus, but it is difficult to take the disk-type planar component out. Therefore, the combined structure is placed on the auxiliary support 3, and the lug boss 31 on the auxiliary support penetrates through the arc groove 12 on the substrate 1. The arc silicone rubber plate 32 thereon contacts the clamping surface of the disk-type planar component 6, and then the machined disk-type planar component 6 is jacked up, thus realizing that the workpiece is taken out without damage.

Figure 6:
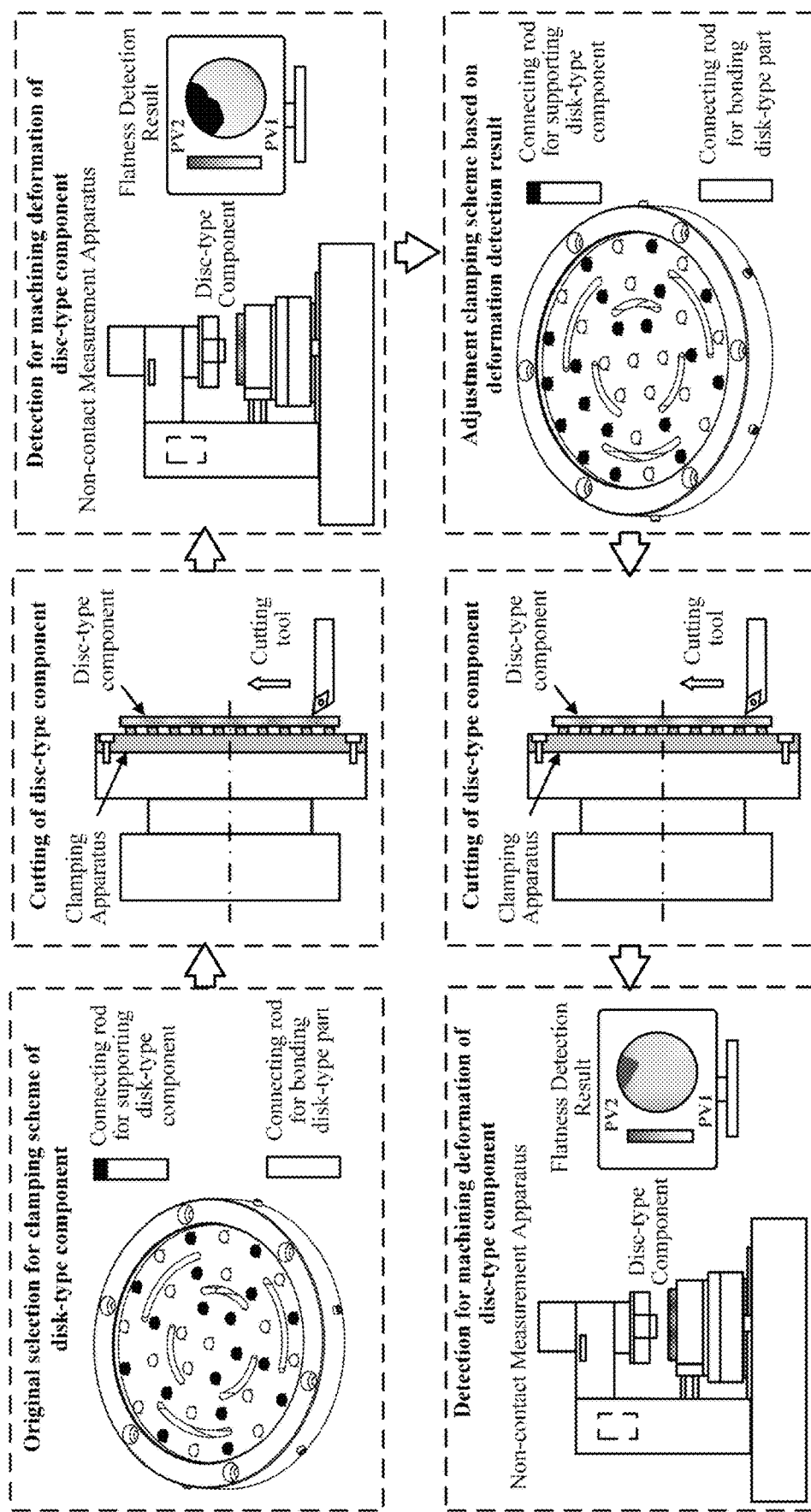
FIG. 6 is an adjustment flow of a bonding scheme aimed at reducing the machining deformation of a disk-type planar component.

As shown in FIG. 6, by giving full play to the flexible and adjustable structure of the designed bonding apparatus, an adaptive clamping method for reducing the machining deformation of the disk-type planar component is proposed by adopting the above apparatus. The specific steps are as follows:

in step one, according to the balance conditions of the force and the moment in the cutting of the disk-type planar component 6, the number and the positions of bonding points of the disk-type planar component 6 are primarily selected. The connecting rods 2 are installed on the substrate 1, and the axial height of the connecting rods 2 is adjusted to the appropriate position. According to a primary bonding scheme, the circular silicone rubber plates 5 are pasted on the upper surfaces of parts of the selected connecting rods 2;

in step two, the whole bonding apparatus is placed on the heating platform for preheating. When preheating is finished, a layer of hot melt adhesive is uniformly coated on the upper surface of the selected connecting rod 2 which plays the role in bonding, and the disk-type planar component 6 is placed on the combined dot matrix bonding apparatus. Subsequently, the heating platform is closed, and after the adhesive between the disk-type planar component 6 and the connecting rod 2 is cooled and solidified, the workpiece can be fixed to the bonding apparatus. The bonding apparatus is fixed on an ultra-precision machine tool by adopting bolts that are matched with mounting holes 13, the trimming bolts 4 are installed on the trimming threaded holes 11 on the substrate 1, and the trimming bolts 4 are adjusted until the detection results of dynamic balance of the machine tool meet the requirements;

in step three, after machining, the disk-type planar component 6 is jacked up by using the auxiliary support 3. A machining surface shape of the disk-type planar component 6 is measured by adopting a non-contact measuring apparatus, thus obtaining the deformation distribution thereof;

in step four, a clamping scheme is adjusted according to the deformation detection results. That is, the number of bonding points in a large deformation area is reduced, and the boundary constraint effect in the area is weakened, so that the unbalanced stress induced by the material removal is fully released in the machining process, thus reducing the machining deformation of the disk-type planar component 6 when the constraint is unloaded;

in step five, the disk-type planar component 6 is refixed on the bonding apparatus according to the revised clamping scheme, then the bonding apparatus is installed on the ultra-precision machine tool, the dynamic balance of the machine tool is readjusted, and the subsequent machining for the disk-type planar component 6 is finished according to the given turning parameters; and in step six, the machining surface shape of the disk-type planar component 6 is detected, the effect of a new clamping scheme is evaluated, and current deformation distribution of the disk-type planar component 6 is determined, to provide data support for the adjustment of the subsequent clamping scheme. The processes of the step four, step five and step six are repeated until the geometric dimension and the surface shape precision of the disk-type planar component 6 are converged to the expected target.

The invention claimed is:

1. A flexible dot matrix bonding apparatus for a disk-type planar component, wherein the flexible dot matrix bonding apparatus for the disk-type planar component comprises a substrate, connecting rods and an auxiliary support;

the trimming threaded holes are circumferentially and uniformly distributed in the substrate, mounting holes are circumferentially and uniformly distributed at an edge of an upper surface, and a groove is located at the middle; multiple arc grooves and threaded through holes are formed in the groove, and a sealing structure is arranged at an outer edge of the groove;

for the connecting rod, a hexagonal socket counterbore is formed on a bottom surface, and an external thread is formed at the bottom;

the auxiliary support contains multiple lug bosses, wherein arc silicone rubber plates are pasted on upper surfaces of the lug bosses, and a cross-sectional profile of the lug boss is identical to that of the arc silicone rubber plate;

when the disk-type planar component is machined, the connecting rods are fixed to the substrate firstly by using the threaded matching relationship; the connecting rods on the substrate are divided into two types, which respectively play roles in bonding and supporting the workpiece; the adhesive is coated on upper surfaces of the connecting rods which play the role in bonding, and circular silicone rubber plates are pasted on upper surfaces of the connecting rods which play the role in auxiliary support, to form a dot matrix clamping apparatus; the disk-type planar component to be machined is placed on a combined dot matrix clamping apparatus, and after the adhesive is cured, the height of the connecting rods which play the role in auxiliary support is adjusted until the circular silicone rubber plate thereon contacts a clamping surface of the disk-type planar component; and when the disk-type planar component is disassembled, the bonding apparatus and the disk-type planar component that are bonded to each other are firstly placed on a heating platform, and the adhesive between the connecting rod and the disk-type planar component is melted; and subsequently, the combined structure is placed on the auxiliary support, and the lug boss on the auxiliary support penetrates through the arc groove on the substrate, wherein the arc silicone rubber plate thereon contacts the clamping surface of the disk-type planar component, and then the machined disk-type planar component is jacked up, thus realizing that the workpiece is taken out without damage.

2. The flexible dot matrix bonding apparatus for the disk-type planar component according to claim 1, wherein the substrate, the connecting rods and the auxiliary support are made of aluminum alloy.

3. The flexible dot matrix bonding apparatus for the disk-type planar component according to claim 1, wherein the width of the arc groove on the substrate is larger than that of the lug boss on the auxiliary support, and the lug boss can move up and down in the arc groove.

4. The flexible dot matrix bonding apparatus for the disk-type planar component according to claim 1, wherein the adhesive is a low melting point adhesive wax with the melting point range of 60° C.-70° C.

5. The flexible dot matrix bonding apparatus for the disk-type planar component according to claim 3, wherein the adhesive is a low melting point adhesive wax with the melting point range of 60° C.-70° C.

6. The flexible dot matrix bonding apparatus for the disk-type planar component according to claim 1, wherein the circular silicone rubber plate is a self-adhesive rubber plate, and 3M gum is arranged on one side thereof.

7. The flexible dot matrix bonding apparatus for the disk-type planar component according to claim 3, wherein the circular silicone rubber plate is the self-adhesive rubber plate, and the 3M gum is arranged on one side thereof.

8. The flexible dot matrix bonding apparatus for the disk-type planar component according to claim 4, wherein the circular silicone rubber plate is the self-adhesive rubber plate, and the 3M gum is arranged on one side thereof.

9. A flexible dot matrix bonding apparatus and an adaptive clamping method for a disk-type planar component, comprising the following steps of:

step one, according to the balance conditions of the force and the moment in the cutting process of the disk-type planar component, primarily selecting the number and the positions of bonding points of the disk-type planar component; installing the connecting rods on the substrate, and adjusting the axial height of the connecting rods to the appropriate position; and according to a primary bonding scheme, pasting the circular silicone rubber plate on the upper surfaces of parts of the selected connecting rods;

step two, placing the whole bonding apparatus on the heating platform for preheating; when preheating is finished, uniformly coating a layer of hot melt adhesive on the upper surface of the selected connecting rods which play the role of bonding, and placing the disk-type planar component on the combined dot matrix bonding apparatus; subsequently closing the heating platform, and cooling and solidifying the adhesive between the disk-type planar component and the connecting rod, thus fixing the workpiece to the bonding apparatus; and fixing the flexible dot matrix apparatus which bonds the disk-type planar component on an ultra-precision machine tool by adopting bolts that are matched with mounting holes, installing the trimming bolts on the trimming threaded holes on the substrate, and adjusting the trimming bolts until the detection results of dynamic balance of the machine tool meet the requirements;

step three, after machining is finished, jacking up the disk-type planar component by using the auxiliary support; and measuring a machining surface shape of the disk-type planar component by adopting a non-contact measuring apparatus, to obtain the deformation distribution thereof;

step four, adjusting a clamping scheme according to the deformation detection results; specifically, weakening the boundary constraint effect by reducing the number of bonding points in a large deformation area, so that the unbalanced stress induced by the material removal is fully released in the machining process, thus reducing the machining deformation of the disk-type planar component when the constraint is unloaded;

step five, fixing the disk-type planar component on the bonding apparatus according to the revised clamping scheme, and then installing the bonding apparatus on the ultra-precision machine tool, readjusting the dynamic balance of the machine tool, and completing the subsequent machining for the disk-type planar component according to the given turning parameters; and step six, detecting the machining surface shape of the disk-type planar component, evaluating the effect of a new clamping scheme, and determining current deformation distribution of the disk-type planar component, to provide data support for the adjustment of the subsequent clamping scheme; and repeating the step four, step five and step six until the geometric dimension and the surface shape precision of the disk-type planar component are converged to the expected target.

\* \* \* \* \*